US006862628B2

(12) United States Patent
Moore et al.

(10) Patent No.: US 6,862,628 B2
(45) Date of Patent: Mar. 1, 2005

(54) ENHANCING APPLICATION PERFORMANCE IN DYNAMIC NETWORKS

(75) Inventors: Timothy M. Moore, Bellevue, WA (US); Arun Ayyagari, Seattle, WA (US); Xiaowen Shan, Kirkland, WA (US); Stephen J. Rauch, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 788 days.

(21) Appl. No.: 09/755,770

(22) Filed: Jan. 5, 2001

(65) Prior Publication Data

US 2002/0091853 A1 Jul. 11, 2002

(51) Int. Cl.$^7$ ............................................. G06G 15/16
(52) U.S. Cl. ....................... 709/236; 709/203; 709/227; 709/229; 709/228; 709/235; 709/239
(58) Field of Search ................................ 709/203, 227, 709/229, 228, 235, 236, 239

(56) References Cited

U.S. PATENT DOCUMENTS

| | | | | |
|---|---|---|---|---|
| 6,336,135 | B1 * | 1/2002 | Niblett et al. ................ | 709/215 |
| 6,473,407 | B1 * | 10/2002 | Ditmer et al. ................ | 370/252 |
| 6,519,254 | B1 * | 2/2003 | Chuah et al. ................ | 370/389 |
| 6,542,931 | B1 * | 4/2003 | Le et al. ....................... | 709/228 |

OTHER PUBLICATIONS

Anonymous, "The Client–Server Model," *Platform SDK: Remote Procedure Call*, Microsoft Corporation, p. 1 (May 1999).
Anonymous, "The Compute–Server Model," *Platform SDK: Remote Procedure Call*, Microsoft Corporation, p. 1 (May 1999).
Anonymous, "How RPC Works," *Platform SDK: Remote Procedure Call*, Microsoft Corporation, pp. 1–2 (May 1999).
Anonymous, "Microsoft RPC Components," *Platform SDK: Remote Procedure Call*, Microsoft Corporation, p. 1 (May 1999).
Anonymous, "OSF Standards for RPC," *Platform SDK: Remote Procedure Call*, Microsoft Corporation, p. 1 (May 1999).
Anonymous, "The Programming Model," *Platform SDK: Remote Procedure Call*, Microsoft Corporation, pp. 1–2 (May 1999).

(List continued on next page.)

*Primary Examiner*—Anthony Knight
*Assistant Examiner*—Thomas Pham
(74) *Attorney, Agent, or Firm*—Leydig, Voit & Mayer, Ltd.

(57) ABSTRACT

A method and device are disclosed that enable a user to experience continuity by alleviating blocking of an application by a slow or failure-prone connection. The method includes dissociating the user interface from an application-client managing communications with a server over the dynamic connection. Furthermore, the application-client caches user input for later actions using an asynchronous mechanism to enable the user to work with little interruption. Furthermore, adjustable frame sizes based on the error rate and bandwidth-delay increase throughput. Data retransmission is reduced by maintaining state information for the client and the server so that a disrupted transaction is resumed at or close to the point of disruption and in response to media sense-events. Consequently, establishing, tearing down and adjusting network connections in response to events such as: high error rates, increasing latency, availability of better alternative connections, or loss of a connection do not interrupt the user's experience.

21 Claims, 10 Drawing Sheets

OTHER PUBLICATIONS

Anonymous, "Summary: RPC Extends Client–Server Computing," *Platform SDK: Remote Procedure Call*, Microsoft Corporation, p. 1 (May 1999).

Anonymous, "Using RPC for IPC," *Platform SDK: Remote Procedure Call*, Microsoft Corporation, p. 1 (May 1999).

Anonymous, "XCLN: Troubleshooting RPC Problems for Exchange Clients," Microsoft Corporation, pp. 1–5 (Apr. 1999).

Anonymous, "XGEN: Changing the RPC Binding Order," Microsoft Corporation, pp. 1–4 (Apr. 1999).

Ayyagari et al., "Wireless Network Performance Study," Windows Ntwk & Comm Platform Tech. Microsoft Corporation, pp. 1–27 (Jan. 2000).

Groves, Jim, "What's New for Microsoft Outlook 2000 Developers," Microsoft Corporation, pp. 1–9 (May 1999).

Rauch, Stephen, "Local Store Overview," Microsoft Corporation, pp. 1–9 (Mar. 1999).

Rizzo, Thomas, "Microsoft Outlook 2000: Office's Killer App Just Keeps Getting Better," Microsoft Corporation, pp. 1–10 (Nov. 1998).

Windows Network Infrastructure Team, "Windows NT: Networking," *IEEE 802.11 Security White Paper*, Microsoft Corporation, pp. 1–20 (Mar. 2000).

U.S. Appl. No. 09/412,739, filed Oct. 4, 1999, Alex Hopmann et al.

U.S. Appl. No. 09/556,764, filed Apr. 24, 2000, Pradeep Bahl et al.

U.S. Appl. No. 09/652,501, filed Aug. 31, 2000, Pradeep Bahl et al.

* cited by examiner

ENHANCING APPLICATION PERFORMANCE IN DYNAMIC NETWORKS

TECHNICAL FIELD OF THE INVENTION

The present generally invention relates to client-server software. More particularly the invention relates to client-server applications operating in networks with failure-prone connections.

BACKGROUND OF THE INVENTION

Computing is no longer a preserve of traditional computers, but instead includes portable computing devices capable of establishing connections to other devices. Such portable computing devices include operating systems supporting applications providing desired functionality to users. However, networking-capable portable computing devices suffer from failure-prone network connections. This is particularly true of devices utilizing wireless connections. Such failure-prone transient connections are termed dynamic connections.

Wireless dynamic connections include symmetric or asymmetric connectivity to a base station, which is also termed an access point ("AP"). In typical asymmetric connections the forward link (from the base station to the device) bandwidth is larger than the reverse link (from the device to the base station) bandwidth. In contrast, symmetric connections have equal bandwidth available in both the forward and the reverse link. Performance of applications communicating over wireless connections typically depends on available bandwidth, the bit error rates ("BER") encountered and the end-to-end latency that may range from the order of few or 10s of milliseconds to the order of 100s of milliseconds.

A measure of the effectiveness of an application using a wireless connection is the amount of data transmitted across the connection in the course of timely completion of an assigned task. The time taken to transmit data, which is an indicator of application performance, depends on the amount of data, the availability of suitable connections and the error rate in transmitting data. High error rates require significant retransmission of data-packets, thus slowing down the application. The amount of data is determined by not only the data generated by the application, but also by the need to package the data into data packets. Header information encapsulates each data packet and enables routers to direct the data packet to a suitable target. Once received, the data packets are processed using the header information to extract and reconstitute the data from the data-packets.

Many computing devices allow selection of a suitable connection to other devices or network by sensing the available connections. Some devices select one or more suitable connections for a task at hand. Devices capable of discovering and responding to the nature and state of their connections are said to provide a "media-sense" property. Devices with media-sense make a user's computing experience less intimidating if selecting suitable connections, establishing connections and monitoring the connections is transparent to the user. Naturally, applications providing pervasively used functionality such as email and web browsing benefit by being media-sense aware.

Devices that are not media-sense aware merely fail when a connection fails. This failure may be limited to an application using the failed connection or may result in the need to reboot the entire device or at the least reinitializing/relaunching the application. Media-sense aware devices, on the other hand, actually monitor connections or save the state of the machine to allow the user to continue while alternative connections are explored and established. Even more sophisticated media-sense aware devices not only try alternatives, but also compare the available connections to choose the optimal connection.

Media-sense aware devices exhibit client-server interactions in that one device, the client, requests data or services from the other device, the server. Examples of applications providing client-server interactions include "OUTLOOK®" manufactured by MICROSOFT CORPORATION® of Redmond, Wash. "OUTLOOK®" provides users with email, organizer, calendar services and the ability to customize user experience. "OUTLOOK®" assumes the availability of reliable static connections for its operations. Accordingly, using dynamic connections compromises OUTLOOK®'s performance due to dynamic connections' failure-prone transient nature.

However, media-sense devices are not enough for effective client-server application operation in a dynamic computing environment. In addition to broken dynamic connections, computing environments present problems relating to bandwidth limitations, computational resource limitations and security needs/requirements. Furthermore, dynamic computing environment applications are not expected to compromise on the functionality provided to the users such as ready access to stock information, voice mail, chat rooms and the like—and all while on the go.

SUMMARY OF THE INVENTION

In view of the foregoing, the present invention comprises a method and system for providing connectivity in client-server applications using a dynamic connection to other devices. The invention enables a user to experience continuous service despite changes to the link including failure of the dynamic connection resulting in a loss of network connectivity in the interim period.

Briefly, the invention includes steps for alleviating blocking of an application by a slow or failure-prone dynamic connection. The steps include dissociating the application into at least a user interface and an application-client. The application-client manages communications with a server over the dynamic connection. Furthermore, the application-client stores user input for later actions if a satisfactory connection to the server is unavailable.

An embodiment of the invention utilizes an asynchronous mechanism (allowing servicing requests in an out-of-order manner) instead of a customary synchronous design (in-order servicing of requests) for client server interactions across a dynamic connection. This design, in effect, dissociates the front-end user interface from the underlying client-server interactions by allowing each to function independently. Consequently, a user working on a variety of tasks does not confront a stalled system or unpredictable latency due to lost or dropped connections.

The invention also reduces the overhead and, consequently, the need for additional bandwidth in transactions over the dynamic connection by tailoring the data-packet frame size based on the error rate in transmitting data on the dynamic connection. Furthermore, overall data transmission volume is reduced by avoiding repeated transmission of the same data due to interruptions caused by failure of the dynamic connection.

The reduction in transmitted data is achieved, in part, by maintaining state information for the client and the server during a client-server transaction. Conveniently, a transaction refers to data transfers between the client and the server following which the state of the client and the server is reinitialized since no sub-components remain to be transmitted. The saved state information allows resuming a disrupted transaction at or close to the point where the disruption occurred rather than repeating the entire transaction.

Furthermore, in an embodiment of the invention client-server interactions are transparently adjusted in response to media sense-events. Consequently, establishing, tearing down and adjusting network connections in response to events such as high error rates, increasing latency, availability of better alternative connections or loss of a connection do not interrupt the user's experience.

Additional features and advantages of the invention will be made apparent from the following detailed description of illustrative embodiments, which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
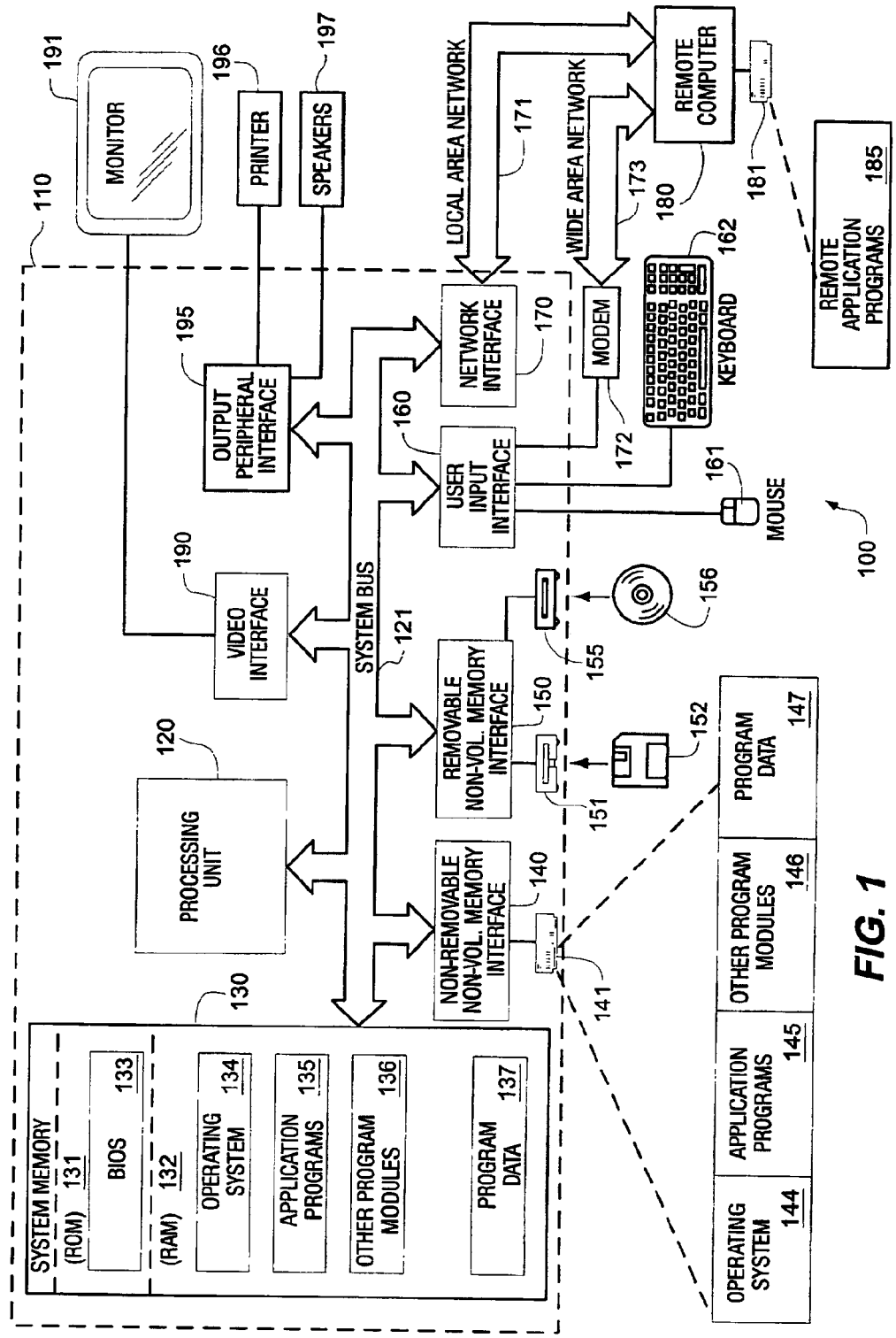
FIG. 1 is a block diagram generally illustrating an exemplary computing environment in which software for operation in a dynamic environment may be implemented along with higher-level languages being used to describe desired services, including services pertaining to the database.

The invention described herein in detail alleviates blocking of an application by a slow or failure-prone dynamic connection. In accordance with the invention, at least a user interface part and an underlying application-client, obtained in part by dissociating the application, allow implementation of an asynchronous link between a server and the application-client over the dynamic connection. By way of example, the computing environment is similar to that illustrated in FIG. 1, although FIG. 1 is not a limitation on the claimed invention. Furthermore, advantageously, this design dissociates the front-end user interface from the underlying client-server interactions by allowing each to function independently. Consequently, a user working on a variety of tasks does not confront a stalled system or unpredictable latency due to lost or dropped connections.

Turning to the drawings, wherein like reference numerals refer to like elements, the invention is illustrated as being implemented in a suitable computing environment. Although not required, the invention will be described in the general context of computer-executable instructions, such as program modules, being executed in a computing environment. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general-purpose or special-purpose computing system environments or configurations. Examples of well-known computing systems, environments, and configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, and distributed computing environments that include any of the above systems or devices.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as Mezzanine bus.

The computer 110 typically includes a variety of computer-readable media. Computer-readable media can be any available media that can be accessed by the computer 110 and include both volatile and nonvolatile media, removable and non-removable media. By way of example, and not limitation, computer-readable media may include computer storage media and communications media. Computer storage media includes volatile and nonvolatile, removable and non-removable media implemented in any method or technology for storage of information such as computer-readable instructions, data structures, program modules, or other data. Computer storage media include, but are not limited to, random-access memory (RAM), read-only memory (ROM), EEPROM, flash memory, or other memory technology, CD-ROM, digital versatile disks (DVD), or other optical disk storage, magnetic cassettes, magnetic tape, magnetic disk storage, or other magnetic storage devices, or any other medium which can be used to store the desired information and which can accessed by the computer 110. Communications media typically embody computer-readable instructions, data structures, program modules, or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communications media include wired media such as a wired network and a direct-wired connection and wireless media such as acoustic, RF, optical, and infrared media. Combinations of the any of the above should also be included within the scope of computer-readable media.

The system memory 130 includes computer storage media in the form of volatile and nonvolatile memory such as ROM 131 and RAM 132. A basic input/output system (BIOS) 133, containing the basic routines that help to transfer information between elements within the computer 110, such as during start-up, is typically stored in ROM 131. RAM 132 typically contains data and program modules that are immediately accessible to or presently being operated on by processing unit 120. By way of example, and not limitation, FIG. 1 illustrates an operating system 134, application programs 135, other program modules 136, and program data 137. Often, the operating system 134 offers services to applications programs 135 by way of one or more application programming interfaces (APIs) (not shown). Because the operating system 134 incorporates these services, developers of applications programs 135 need not redevelop code to use the services. Examples of APIs provided by operating systems such as Microsoft's "WINDOWS" are well known in the art.

The computer 110 may also include other removable/non-removable, volatile/nonvolatile computer storage media. By way of example only, FIG. 1 illustrates a hard disk interface 140 that reads from and writes to non-removable, nonvolatile magnetic media, a magnetic disk drive 151, which may be internal or external, that reads from and writes to a removable, nonvolatile magnetic disk 152, and an optical disk drive 155 that reads from and writes to a removable, nonvolatile optical disk 156 such as a CD ROM. Other removable/non-removable, volatile/nonvolatile computer storage media that can be used in the exemplary operating environment include, but are not limited to, magnetic tape cassettes, flash memory cards, DVDs, digital video tape, solid state RAM, and solid state ROM. The hard disk drive 141, which may be internal or external, is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer-readable instructions, data structures, program modules, and other data for the computer 110. In FIG. 1, for example, hard disk drive 141 is illustrated as storing an operating system 144, application programs 145, other program modules 146, and program data 147. Note that these components can either be the same as or different from the operating system 134, application programs 135, other program modules 136, and program data 137. The operating system 144, application programs 145, other program modules 146, and program data 147 are given different numbers here to illustrate that they may be different copies. A user may enter commands and information into the computer 110 through input devices such as a keyboard 162 and pointing device 161, commonly referred to as a mouse, trackball, or touch pad. Other input devices (not shown) may include a microphone, joystick, game pad, satellite dish, and scanner. These and other input devices are often connected to the processing unit 120 through a user interface 160 that is coupled to the system bus, but may be connected by other interface and bus structures, such as a parallel port, game port, or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or via another appropriate mechanism. In a networked environment, program modules depicted relative to the computer 110, or portions thereof, may be stored in a remote memory storage device. By way of example, and not limitation, FIG. 1 illustrates remote application programs 185 as residing on memory device 181, which may be internal or external to the remote computer 180. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains them at locations in the memory system of the computer, which reconfigures or otherwise alters the operation of the computer in a manner well understood by those skilled in the art. The data structures where data are maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

Dynamic networks typically include failure-prone transient links, also termed dynamic connections. Consequently applications operating in a dynamic network frequently encounter dynamic connection failures or changes in a dynamic connection being used by a particular application. Mobile computing units connecting to a network via a wireless connection provide a familiar example of a dynamic connection and the associated challenges.

Various wireless networks support connections spanning a broad range of data transfer rates and offer flexibility to mobile users. Furthermore, wireless connections can be made secure with support for authentication and encryption to make them suitable for handling restricted information. Secure wireless connections employ encryption based on symmetric or asymmetric keys. However, wireless network connections, apart from their bandwidth limitations, also exhibit frequent failures. Commonly these failures reflect conditions such as high error rates, low signal strength and the like. These observations are used to devise devices, methods and systems suited for operation in dynamic networks in accordance with this invention.

Figure 2:
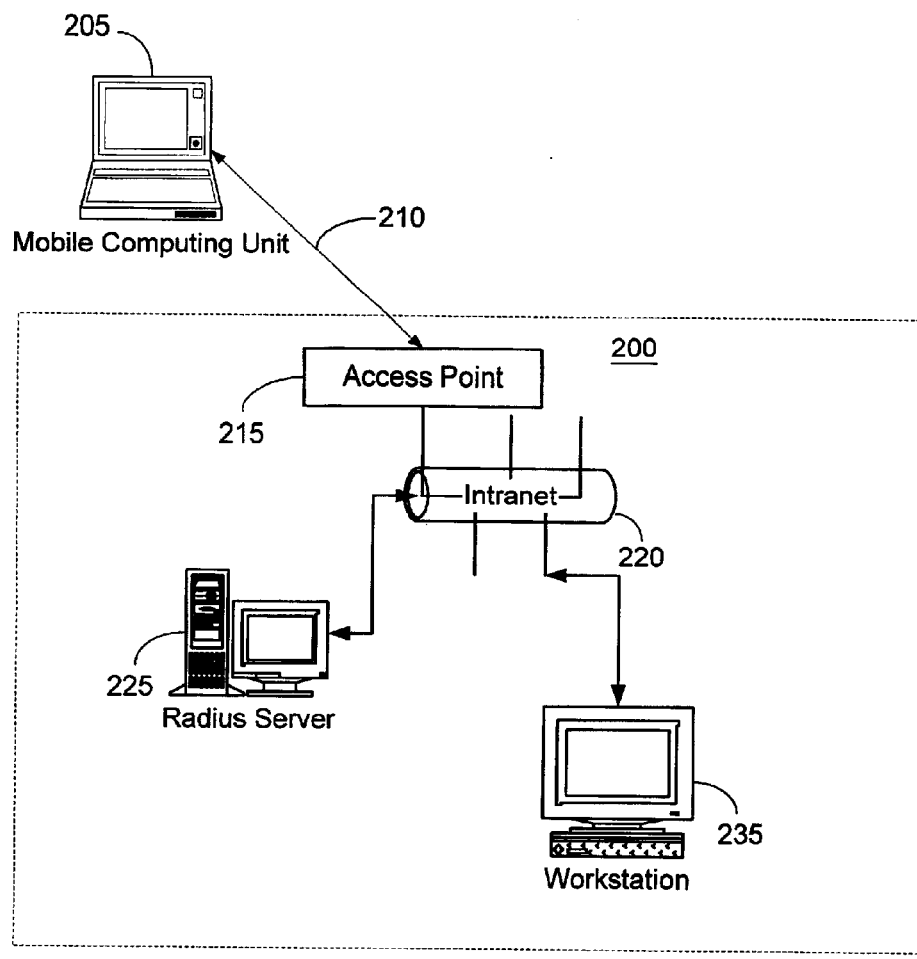
FIG. 2 illustrates a computing environment including a dynamic connection in which an embodiment of the invention operates.

FIG. 2 illustrates a computing environment 200 suitable for supporting wireless links. A mobile computing unit 205, by way of example one similar to computing system environment 110 of FIG. 1, associates via a link 210 with an access point 215. The access point 215 serves as an authenticator for the mobile computing unit 205 to grant access to computing resources in the computing environment 200. The radius server 225 forwards requests for identity and proof of identity to the access point 215. The access point forwards the requests to the mobile computing unit 205 to prevent any direct communication between the radius server 225 and a non-authenticated mobile computing unit 205. Asserted identities and certificates to authenticate asserted identities received from the mobile computing unit 205 are forwarded to the radius server 225. Following approval by the radius server 225, a dynamic connection is defined over the link 210. Of course, in non-secure networks there is no need to undertake the authentication and authorization steps. Consequently, in a non-secure context, the mobile computing unit may directly associate with the access point 215 and establish the dynamic connection over the link 210.

Figure 3:
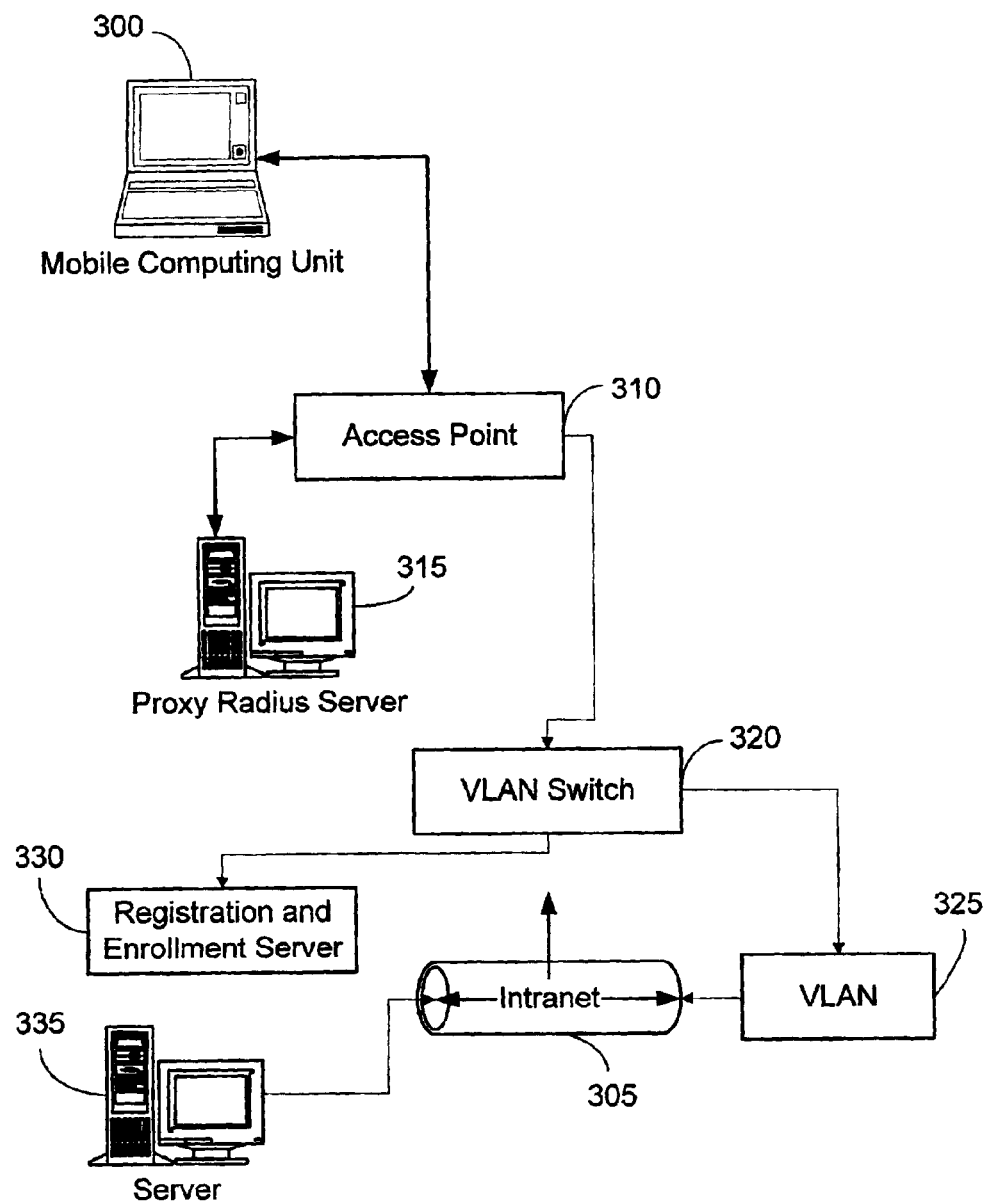
FIG. 3 illustrates another computing environment including a dynamic connection, in which an embodiment of the invention operates.

FIG. 3 illustrates a mobile computing unit 300 attempting access to a secure intranet 305 from a remote site. As illustrated, extensive authentication and authorization requirements are a significant source of overhead and resultant latency in repeatedly broken and reestablished connections. Therefore the bandwidth requirements are more demanding when dynamic connections are used to access a secure network. In FIG. 3 a mobile computing unit 300 associates with a remote access point 310, which acts as an authenticator and uses a proxy radius server 315 to authenticate the mobile computing unit 300. Following successful authentication the remote access point 310 forwards packets directed to the network to a VLAN switch 320. The VLAN switch 320 consults a registration and enrollment server 330 to determine whether the mobile computing unit 300 is permitted to remotely access the VLAN 325, which is connected to the intranet 305. In the case of a duly registered mobile computing unit 300, communications directed to the VLAN 325 or to a server 335 connected via the intranet 305 are forwarded to their specified destinations. If authentication fails then packets are blocked from further propagation to the VLAN 325, or server 335.

Applications, including those using dynamic connections, have at least one user interface for interacting with human users. Of course, it is possible that an application may lack a user interface if there is little need to directly interact with a human user. In general the user interface is used to obtain user input from a user and provide output to the user. Furthermore, many applications communicate over the network with other applications to obtain data and services in response to such user input.

Applications need to access the network in order to obtain a requested service or data. Such requests are often communicated through Remote Procedure Calls ("RPCs"). Applications at the remote computer see the request as being submitted from a local software module while the application making the request sees the request as being to a local software module. Requests for the remote services are redirected using RPC stubs and RPC runtime to the appropriate computer. Such requests are sent over the network with additional encapsulation of the packets to ensure handling of the requests as RPCs, thus adding to the overhead and consuming bandwidth. Furthermore, several requests can be combined into a single RPC.

In an embodiment of the invention, an application using RPC to primarily data framing, flow control and retransmission of frames instead uses the TCP framing, flow controls and retransmission mechanisms. In addition, TCP/IP provides for flexible frame sizes specified to maximize throughput and helps avoid the overhead of yet another protocol.

Figure 4:
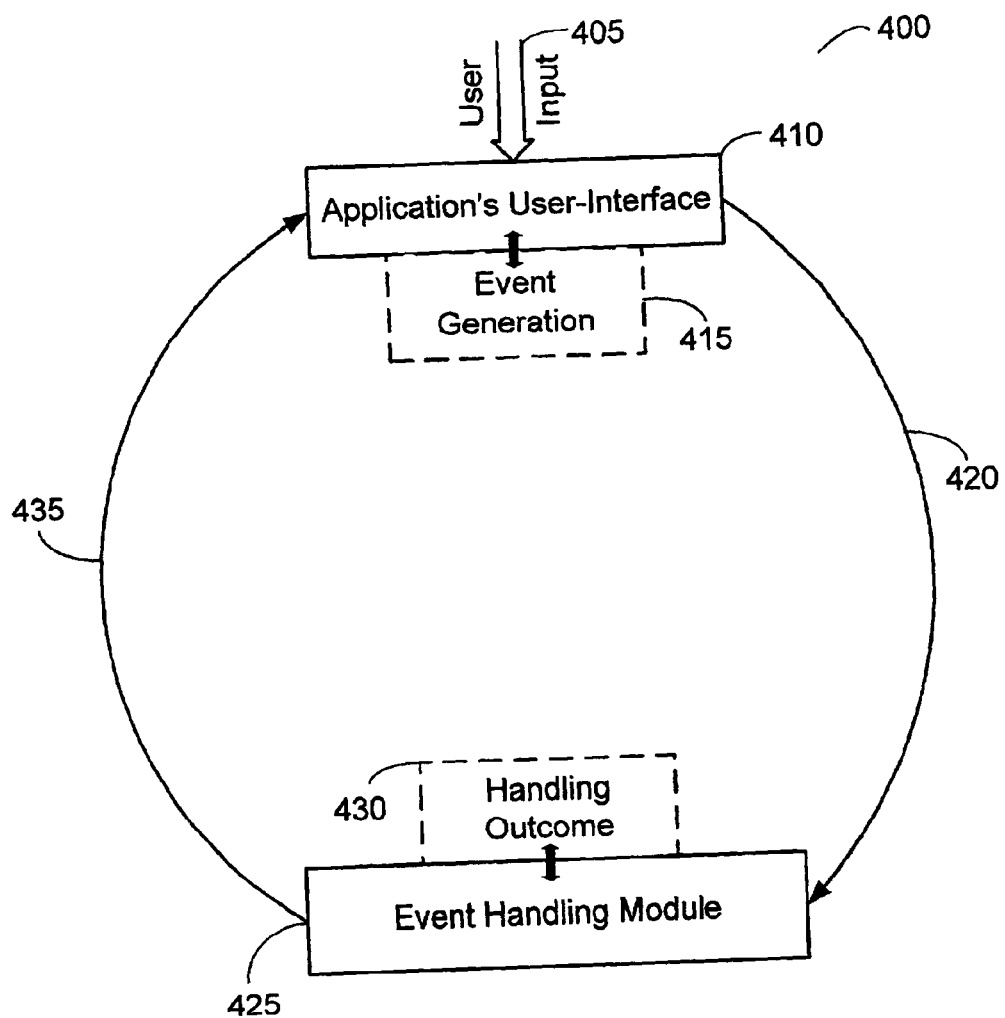
FIG. 4 illustrates an exemplary message loop.

A common design for applications utilizes a message loop. A message loop requires sending the result of a performed requested task to the requesting software module upon completing the task. FIG. 4 depicts these steps in an exemplary message loop 400. A user input 405 to a user interface 410 generates one or more events with the aid of other software modules 415. The generated events result in an initial message 420 being passed to an event-handling module 425, which either alone or in combination with other software modules generates an outcome 430. The originating module, i.e., the user interface 410, receives the outcome 430 via a confirmation message 435 that confirms the initial message has been acted upon.

Handling a user input refers to completing the message loop. For example, an application processing user input for sending an email generates a message corresponding to complete transmission of the email to complete the message loop. User requests may result in more than one message loop being generated as software modules interact with each other. All of the message loops are completed with the handling of events associated with the user requests.

Applications using a synchronous design for some or all of their internal transactions are subject to blocking if the message loop is not completed. In other words, a synchronous application waits for the message loop to complete prior to executing another task. An asynchronous application executes other tasks while a message loop completed. The completion of the message loop is communicated to the asynchronous application by suitable interrupts or detected by the asynchronous application using a polling strategy or other techniques favored by the application's developer.

Failure to complete a message loop in a synchronous application results in the user encountering a non-responsive user interface while the application waits for the message loop to complete. This block occurs, for instance, if a dynamic connection fails and results in delay or failure to complete a request to send an email. The application is unable to process additional requests until the block is cleared. Thus, a failed or slow dynamic connection introduces substantial delays and performance loss by blocking the application while attempting to complete the request.

Figure 5:
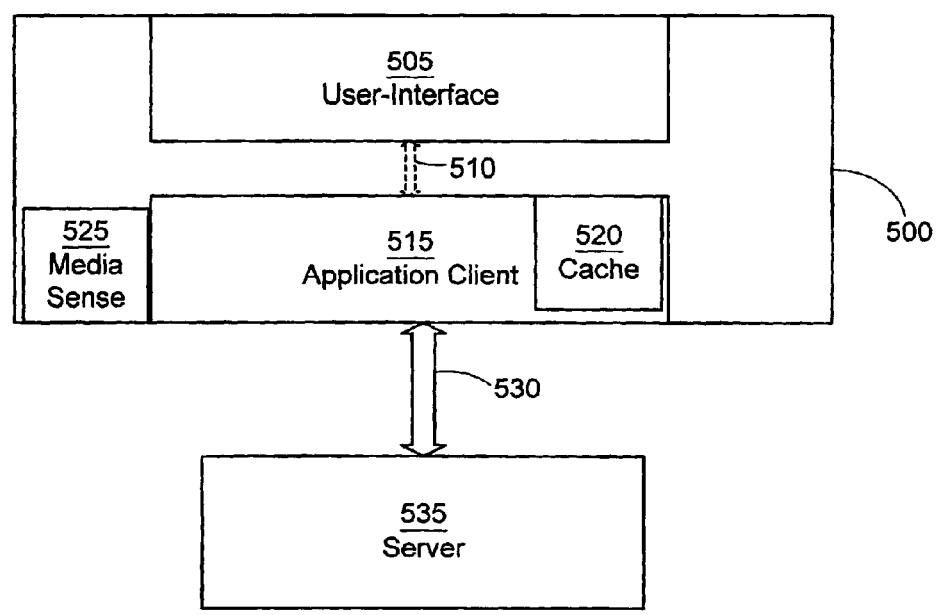
FIG. 5 illustrates a schematic design of a device in accordance with an embodiment of the invention.

FIG. 5 is a schematic drawing of an application 500 designed in accordance with an embodiment of the invention. Application 500 includes a user interface 505 that communicates using a messaging scheme 510 with an application-client module 515. The application 500 includes an application-client 515, which manages communications with a server 535. The application-client 515 has access to a store 520 for storing user requests and a media sense module 525. In this design, the application-client 515 handles events generated by the user interface 505 by indicating receipt of a message corresponding to the event. The application-client may cache the message or further act in accordance with the message. Thus, the interactions between the user interface 505 and the application-client 515 are synchronous in that the user interface 505 knows that the application-client 515 has received the message although it does not know if actions downstream of the application-client 515 have been carried out.

Application-client 515 manages communications via the dynamic connection 530 to the server 535 in an asynchronous manner. Thus, the application-client 515 caches the task requiring communication with the server 535 in the store 520 if the dynamic connection 530 is not available. Upon availability of the dynamic connection 530, the application-client 515 sends or receives the necessary services or data from the server 535. While executing a task, the application-client 515 also continues to cache additional input from the user interface 515. This design leaves the user interface 505 available to the user for executing additional requests. Even in this asynchronous implementation, in some embodiments, requests requiring data or services from the server 535 prior to accepting another user input can result in blocking the user interface 505. However, such blocking is not due to the application waiting for a message loop to complete. Instead, the application is waiting for an event, which in this case is the required information from the server. In general, such an event is not due to a prior action taken by the application.

The media sense module 525 provides the application-client 515 with information about available connections to the server 535. In general, the media sense module 525 responds to cessation of traffic on the link underlying the dynamic connection 530. In addition, it can respond to the error rate or latency over the dynamic connection 530. In an embodiment of the invention, the media sense module 525 selects a better connection than the dynamic connection 530 if a better connection is available. The media sense module 525 can participate in establishing a new connection, negotiating a frame size for packets sent over an available connection and generating events allowing other modules to respond. Thus, when the dynamic connection 530 fails, the media sense module 525 flags the failure and generates an event. This event causes the application-client 515 to abort the current action over the dynamic connection 530 and cache the aborted action in the store 520. Further details on the variations possible with media sense aware computing machines are described in the United States patent application titled "System and Methods for Resynchronization and Notification in Response to Network Media Events," having the Ser. No. 09/652,501 (attorney docket number 205238), filed on Aug. 31, 2000. This application, also assigned to the assignee of this application, is incorporated herein by reference in its entirety.

Figure 6:
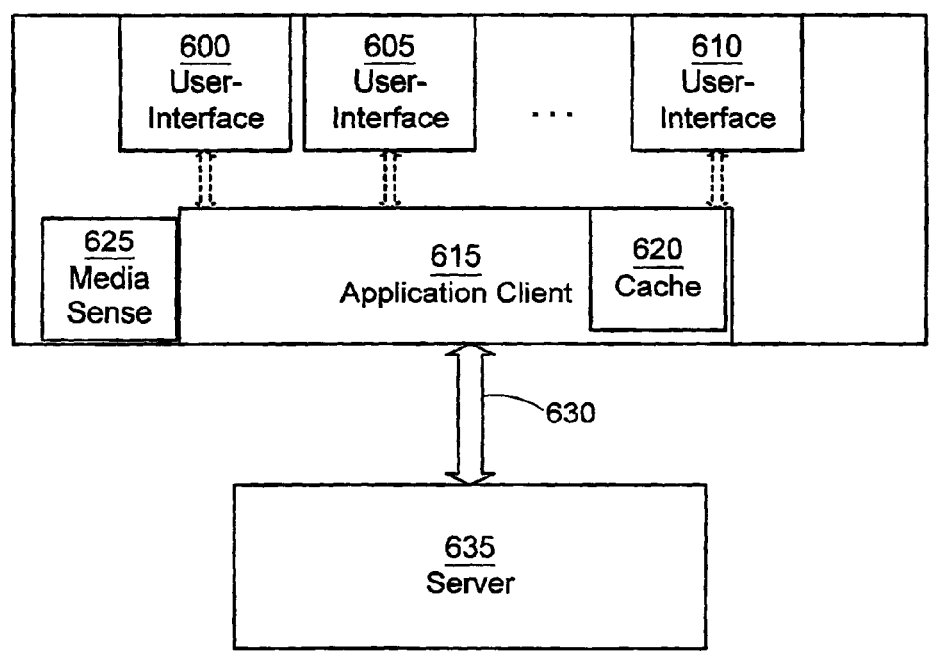
FIG. 6 illustrates another schematic design of a device having multiple users interface modules that use a common client module in accordance with an embodiment of the invention.

FIG. 6 illustrates an embodiment of the invention such that several user interface modules, designated as 600, 605 and 610 use the same application-client 615. The application-client 615 utilizes a store 620 and uses a media sense module 625 to manage communications over a dynamic connection 630 to a server 635. The user interface modules 600, 605 and 610 represent separate applications that share at least the application-client 615.

Figure 7:
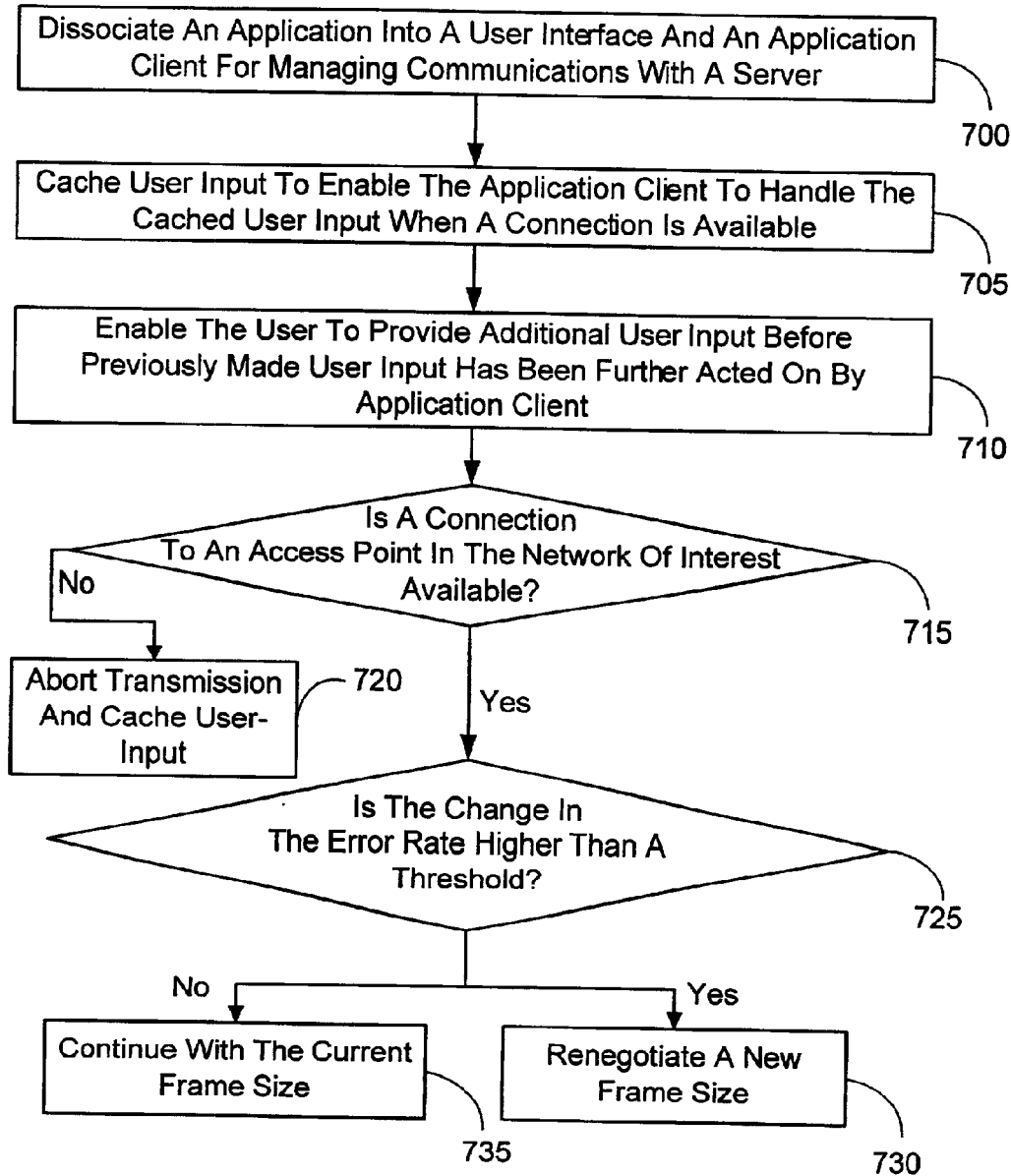
FIG. 7 is a flow diagram summarizing the steps for modifying a synchronous application to get an asynchronous application in accordance with an embodiment of the invention.

FIG. 7 summarizes steps in a method, in accordance with an embodiment of the invention, for providing the functionality of a synchronous application in a dynamic network by using an asynchronous design. At step 700 an application user interface of the application is dissociated from an application-client such that the application-client manages the communications with the server. The user interface provides information obtained from the application-client about the communications with the server. Different software modules for the user interface and the application-client are used to implement the distinct functions. Alternatively, two or more separate threads are used to implement the different functions provided by the user interface and the application-client respectively. The application-client is sensitive to disruptions due to failure or changes in one or more dynamic links used to communicate with one or more servers. Thus, the application-client caches user input during step 705 in a synchronous interaction with the user interface. Caching delays are unlikely when the user interface and the application-client are on the same machine because the caching step 705 is a relatively fast step. The synchronous interaction between the user interface and the underlying application-client during step 710 permits the application to receive additional user input before the application-client completes actions relating to the cached user input. Such actions by the application-client include completing the requested communication through use of a dynamic connection.

Another embodiment of the invention allows the application to communicate with the application-client, with the application-client simulating the server to the application. Such an implementation facilitates modification of preexisting applications to accommodate the asynchronous connectivity between the application-client and the server. The changes required in the application itself include recognizing that a non-responsive server does not necessarily translate into a lost or disrupted connection requiring a fresh start in the transaction or a hung application. Instead, the modified application recognizes that it has to wait before it can synchronize with the server and thus proceeds with other tasks.

During step 715 a determination, usually by the application-client, is made whether a dynamic connection is available. In an embodiment of the invention a media sense module makes the determination. If a suitable connection is not available during step 720 the application-client caches the interrupted action for later attempts. On the other hand, if a connection is available then the media sense module evaluates the change in error rate during step 725. In an embodiment of the invention if the error rate, often termed the bit error rate ("BER"), is higher or lower than a threshold then during step 730 the application-client negotiates a new frame size for the data packets. Typically, a smaller frame size is preferable for communications over high BER connections to reduce the volume of retransmitted data. On the other hand, a greater number of packets are needed with a concomitant increase in the overhead. Alternatively, if the BER does not change appreciably, then, during step 735 data packets continue to conform to the current frame size. Moreover, frame size adjustments made in response to factors such as estimated bandwidth-delay, due to link and network congestion, reduce the effect of interrupted packets on the throughput. And, in an embodiment of the invention the frame size adjustment is made during a data transmission.

Figure 8:
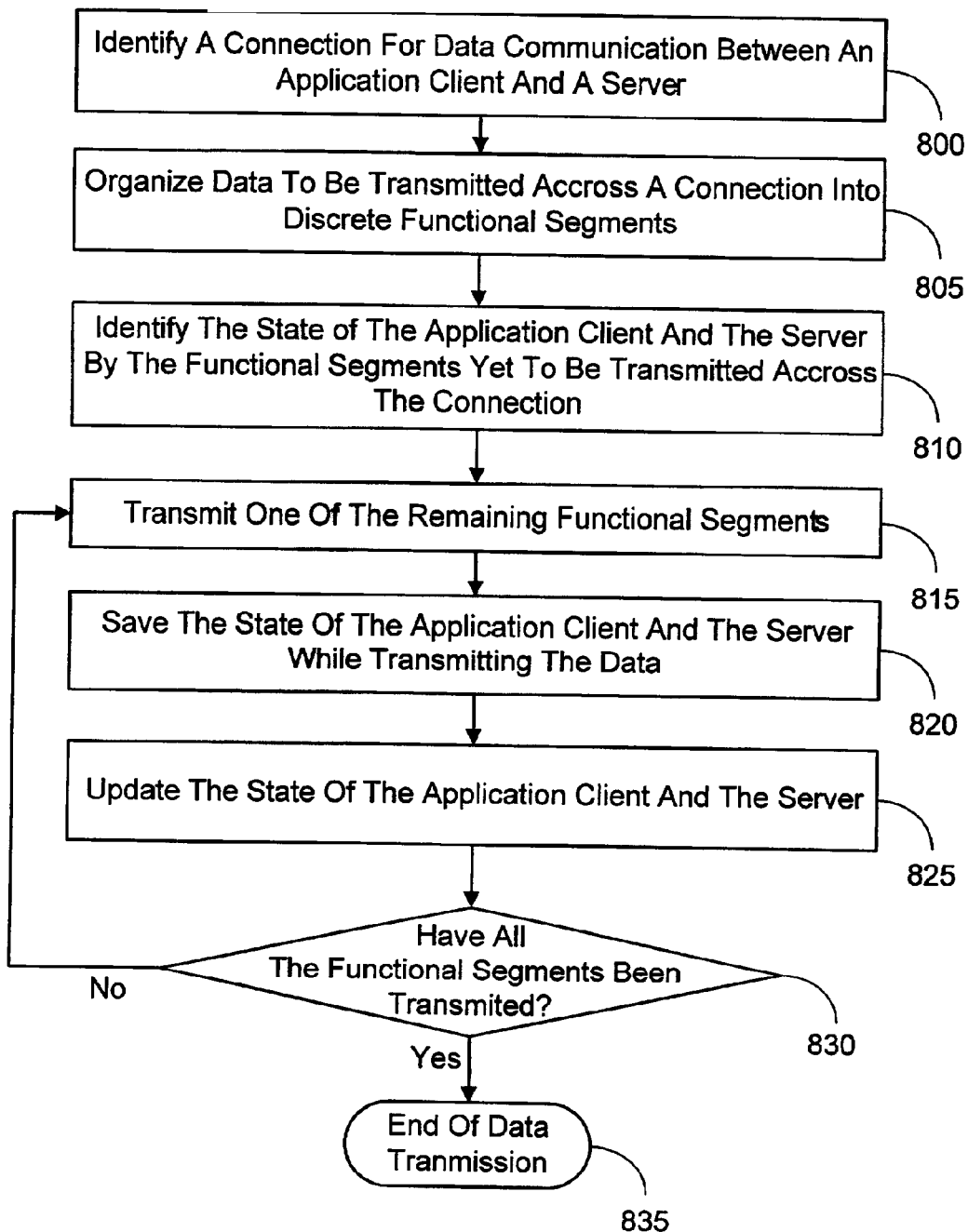
FIG. 8 is a flow diagram summarizing the steps for transmitting data over a dynamic connection in accordance with an embodiment of the invention.

FIG. 8 summarizes another aspect of the invention. This aspect consists of saving the state of the application-client and the server to reduce latency resulting from a need to retransmit information due to failure of a connection. Servers typically do not track the extent to which a transaction has been completed and may even discard the received information if a transaction is disrupted. Consequently, a disrupted connection requires a client application to retransmit all information upon establishment of another connection.

However, a server can provide a description of the state of the information to the client application, e.g., a folder comprising several items, uploaded by the client. Such a description by way of example includes a time stamp and a description of the state of data that the application-client need not understand. At a subsequent time point, if the application-client accesses that information again, then the server obtains the description of the state of the information uploaded by the client to enable the server to provide only the updated or changed information. For instance, if an item was deleted then the application-client is provided with that information and it updates its version by deleting the item. Similarly, if another item was added or modified then the application client uploads the new version of the item to update its folder. At the conclusion of-the transaction, the server provides the application client a modified description of the state of the information uploaded by the client reflecting the current state of the information. Naturally, accessing the server repeats this process for the particular folder. Further discussion and details on synchronizing asynchronous connections are provided in the U.S. patent application Ser. No. 09/412739 filed on Oct. 4, 1999, which is incorporated herein by reference in its entirety.

An embodiment of the invention includes tracking the state of the application-client and the server. The media sense module identifies a connection for data transmission during step 800. Step 805 includes organizing the data to be transmitted into functional segments. This organization advantageously reflects a structure of the data to be transmitted. As an example, emails include attachments, thus each attachment and the email body are treated as discrete functional segments. Functional segments needing to be transmitted describe the state of the application-client or server during step 810. Alternatively, the transmitted functional segments describe the state of the application-client.

There are many ways to track a particular transaction. For instance a unique identifier is assigned to the transaction. When another connection is established, the server identifies the received functional segments belonging to the transaction using the unique identifier of the disrupted previous transaction. Furthermore, the application-client tracks the state of the server in the context of an identifiable transaction. The server is then freed from maintaining state information for each transaction, and remains responsive as a consequence. Upon reconnecting to a server during step 815, the application-client transmits only those functional segments that were not transmitted earlier. Alternatively, during step 815 the application-client requests functional segments not already present on the client machine from the server. It is noted that alternative embodiments wherein the sever tracks the server state are also intended to be within the scope of the invention.

During step 820, the application-client saves the state information for the application-client and the server. In addition, the application-client updates the state information during step 825. Advantageously the application-client performs this updating upon successfully transmitting a functional segment. During step 830 the application-client makes a determination as to whether all of the functional segments have been transmitted. During step 835, upon successful transmission of the functional segments in the transaction the application-client completes the transaction. The application-client removes corresponding entries from the cache and undertakes subsequent actions. Otherwise control returns to step 815 to transmit the remaining functional segments.

Figure 9:
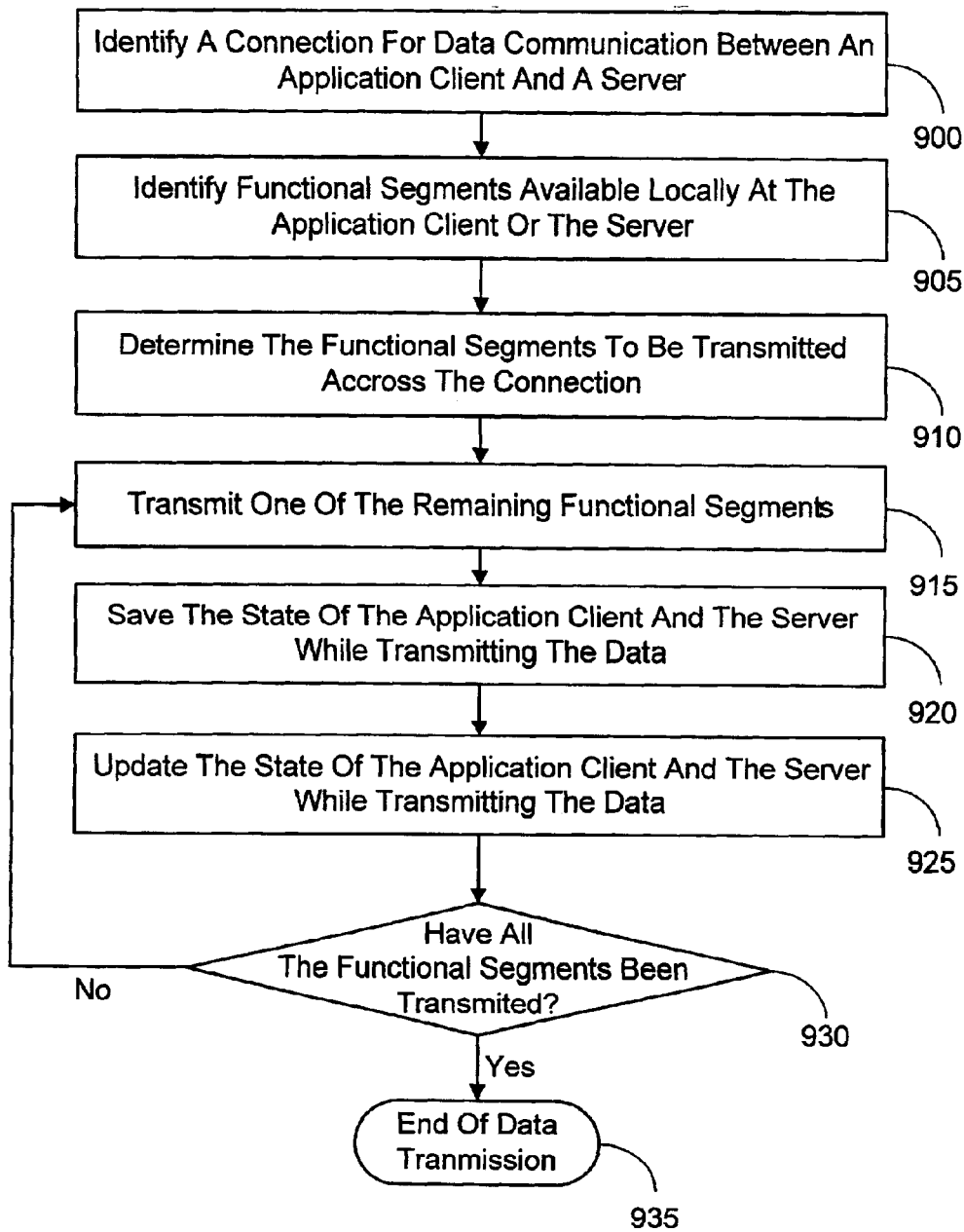
FIG. 9 is a flow diagram summarizing the steps for transmitting functional segments over a dynamic connection while avoiding transmitting functional segments available locally in accordance with an embodiment of the invention.

FIG. 9 summarizes the steps in an embodiment of the invention for reducing the volume of transmitted data using data already available at the other machine. Following identification of a suitable connection during step 900, either the application-client or the server examines the local machine to determine if functional segments in a transaction are locally available. Advantageously, in an embodiment of the invention, functional segments have unique identifiers and are not merely a subset of a particular transaction. Thus, if the same attachment is sent in several emails to the same server, the attachment is not retransmitted. Alternatively, functional segments have identifiers in the context of a transaction and are not retransmitted during the same transaction. Many programs start transmission of an attachment as soon as it is added to an email. However, if the email body is transmitted prior to completion of the transmission of the entire attachment, the transmission of the attachment is aborted and the entire email with the attachment is transmitted again. Other programs, such as OUTLOOK® start downloading documents, emails and the like in the online mode regardless of whether the various functional segments being downloaded are already available locally.

During step 905, identification of locally available functional segments overcomes these problems. Step 910 includes determining functional segments to be transmitted across the connection. During step 915, the application-client or the server transmits the required functional segments. The state of the application-client and the server is saved during step 920 and updated during step 925. During step 930 the application-client or the server makes a determination as to whether all of the functional segments have been transmitted. If all functional segments have been transmitted the transaction concludes during step 935. Otherwise control returns to step 915 to transmit the remaining functional segments.

Figure 10:
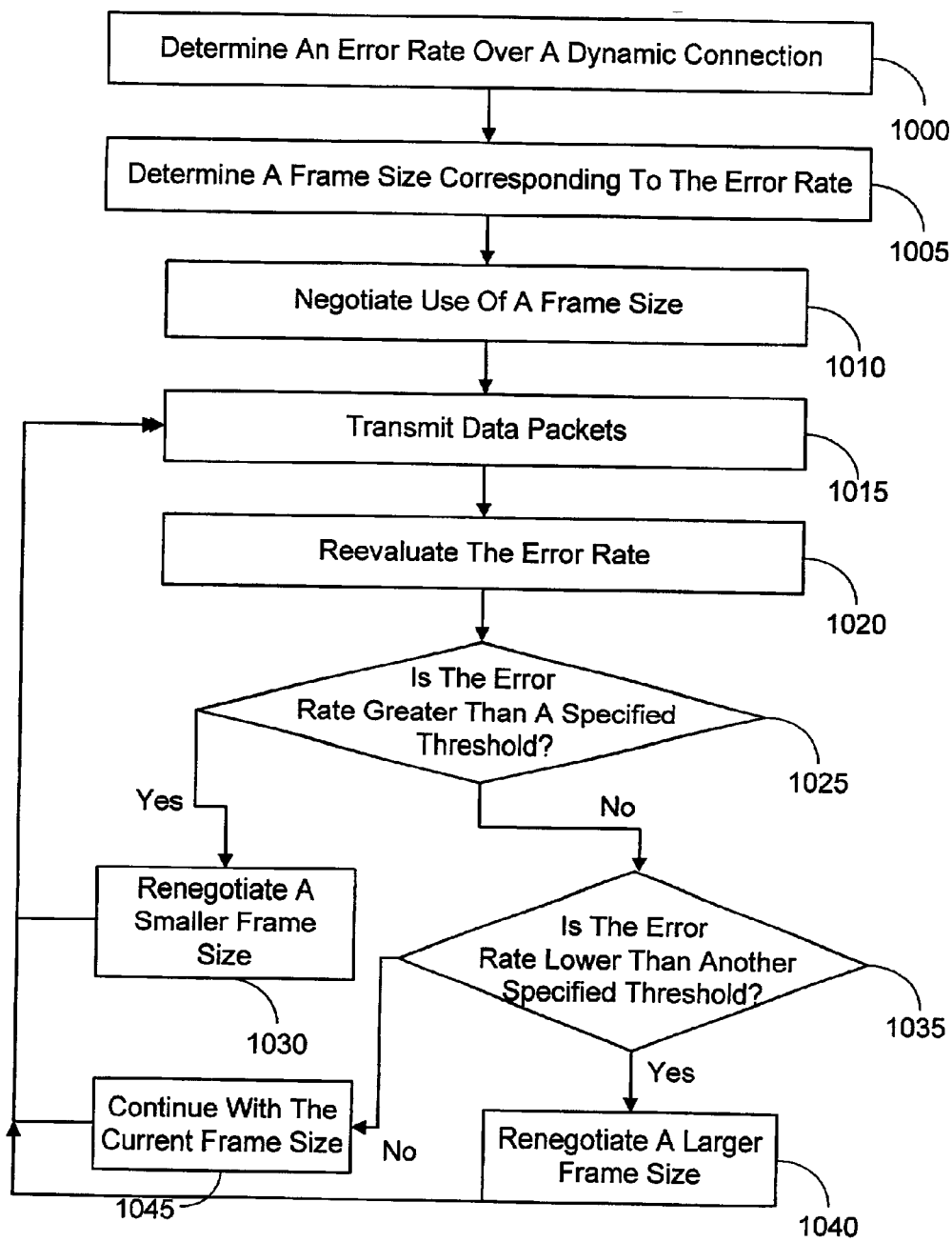
FIG. 10 is a flow diagram summarizing the steps for using the error rate in data transmission over a dynamic connection for adjusting the frame size to reduce the data bits retransmitted in accordance with an embodiment of the invention.

FIG. 10 summarizes steps for conserving bandwidth by choosing a frame size in response to an error rate over a particular connection. Data transmission is typically in the form of packets. The recipient of a data packet acknowledges the receipt of the error free packet to ensure data integrity. A corrupted data packet is retransmitted. Large data packet sizes allow more data to be sent with a smaller relative overhead of routing and error detecting information. However, in the event of an error the entire large packet is retransmitted with attendant waste of bandwidth.

During step 1000 the media sense module determines an error rate for a particular dynamic connection. The application-client identifies a frame size corresponding to the error rate during step 1005. During step 1010 the server and the application-client negotiate a new frame size if the currently used frame size is not suitable for the measured error rate. During step 1015 the server and the application-client transmit data packets using the frame size agreed upon during the negotiations in step 1010. Periodically, as depicted during step 1020, the media sense module re-measures the error rate. If the error rate has changed significantly the measurement results in a re-negotiation of the frame size. This is a very real possibility with wireless connections. In an embodiment of the invention, the media sense functionality flags drastic changes in error rates. During step 1025 the new error rate is compared to a threshold. If the error rate exceeds or equals the threshold then a smaller frame size is negotiated and the control passes to step 1015. Of course, the application-client and the server attempt to change the frame size only if the protocol allows for different frame sizes to be used. If the error rate is less than the specified threshold then it is compared to another threshold during step 1035. If the error rate is greater than the other threshold then control passes to step 1015. Otherwise, control passes to step 1040, and the server and the application-client negotiate a larger frame size followed by control passing to step 1015. If the threshold exceeds the error rate during step 1035, then control passes to step 1045 and the application-client continues to use the current frame size and control returns to step 1015. As explained above, step 1015 includes transmitting additional data packets using the agreed upon frame size.

In view of the many possible embodiments to which the principles of this invention may be applied, it should be recognized that the embodiments described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

We claim:

1. A method of preventing blocking of an application communicating with another device utilizing a connection, wherein the application comprises an application-client configured to communicate asynchronously with a server and a user interface for accepting a user input from and presenting an output to a user, the user input including at least one command requiring communication with the server, wherein the user input is handled by the application, the method comprising the steps of:

forwarding, by the application, a user request to the user interface of the application to the application-client of the application, the user request comprising the at least one command;

issuing, by the application-client of the application, a confirmation message to complete a request-acknowledgment loop between the user interface of the application and the application-client of the application prior to executing the request thereby freeing the user interface of the application to process subsequent user input prior to completion of the request;

storing user input from the user interface of the application for subsequent handling by the application-client of the application; and communicating, by the application-client of the application, with the server to handle the user input received from the user interface of the application.

2. The method of claim 1 having the additional steps of estimating an error rate for successfully transmitting data of interest over the connection;

and selecting a frame size based upon the error rate.

3. The method of claim 1 having the additional steps of estimating a bandwidth-delay, due to link and network congestion, for successfully transmitting data of interest over the connection; and selecting a frame size based upon the bandwidth-delay.

4. The method of claim 1 further including the step of using a default frame size as the frame size if an error rate is not available.

5. The method of claim 1 further including the step of organizing data to be transmitted in a transaction into functional segments; and defining a state of the application-client and a state of the server communicating over the connection by functional segments.

6. The method of claim 5 further including the step of determining the state of the application-client by referencing locally stored functional segments.

7. The method of claim 6 including a description of a step of providing the state of the application-client to the server transmitted to the application-client in the transaction.

8. The method of claim 1 further including the step of determining the state of the server by identifying functional segments already available locally at the server.

9. The method of claim 8 further including the step of providing the state of the server to the application-client to determine a set of remaining functional segments to be transmitted to the server in the transaction.

10. The method of claim 5 further including the step of updating the state of the application-client and the state of the server during a transaction over the connection.

11. The method of claim 6 further including the step of updating the state of the application-client and the server during a transaction over the connection to facilitate the transaction in the event of the dynamic connection failing whereby avoiding repeating the entire transaction.

12. The method of claim 6 wherein the connection is a wireless connection.

13. A device for preventing blocking of at least one application communicating with a network over a connection, the device comprising the at least one application, the at least one application comprising:

at least one software module for presenting a user interface;

at least one client module for asynchronously communicating with a server;

a media-sense module for detecting whether the connection is operational, the media-sense module configured to, at least;

detect cessation of traffic link underlying the connection; and determine an error rate for the connection;

a first software module for saving a state of the at least one client module; and a second software module for retrieving the saved state and continue a communication session when the connection is restored as detected by the media-sense module.

14. The device of claim 13 wherein the client module receives user input from more than one user interface.

15. The device of claim 13 wherein the client module transmits data over the connection In response to a media sense event generated by the media-sense module, the media sense event corresponding to establishment of the connection.

16. The device of claim 13 wherein the client module aborts data transmission over the connection in response to a media sense event generated by the media-sense module, the media sense event corresponding to failure of the connection.

17. The device of claim 16 wherein the client module stores an interrupted data transmission for subsequent attempts.

18. The device of claim 16 wherein the client module updates a state of the server, the state corresponding to data to be transmitted over the connection.

19. The device of claim 16 wherein the client module updates a state of the client module, the stats corresponding to data to be transmitted over the connection.

20. The device of claim 16 wherein the client module updates a state of the server, the state corresponding to data already transmitted over the connection.

21. The device of claim 16 wherein the client module updates a state of the client module, the state corresponding to data already transmitted over the connection.

\* \* \* \* \*